Patented Oct. 23, 1928.

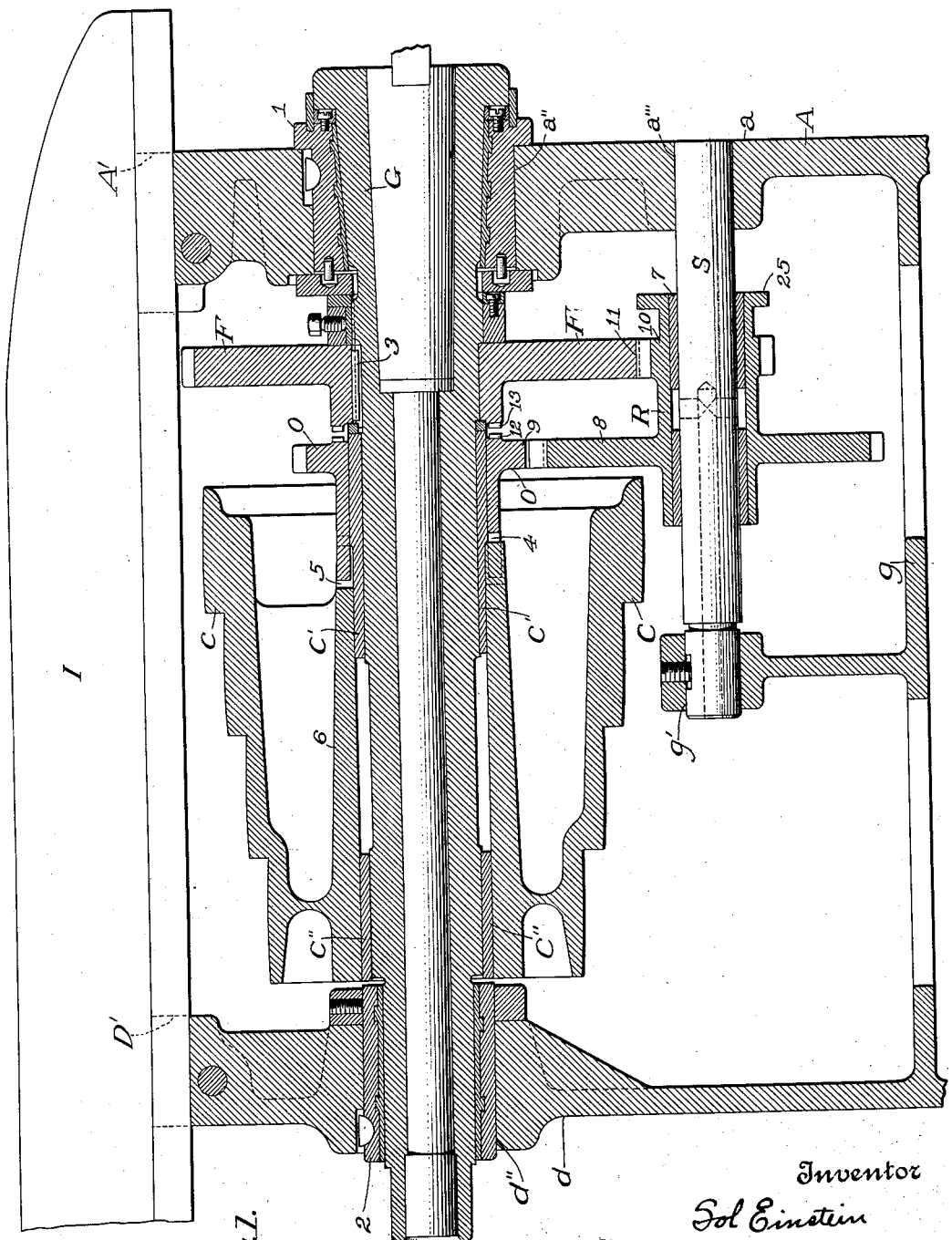

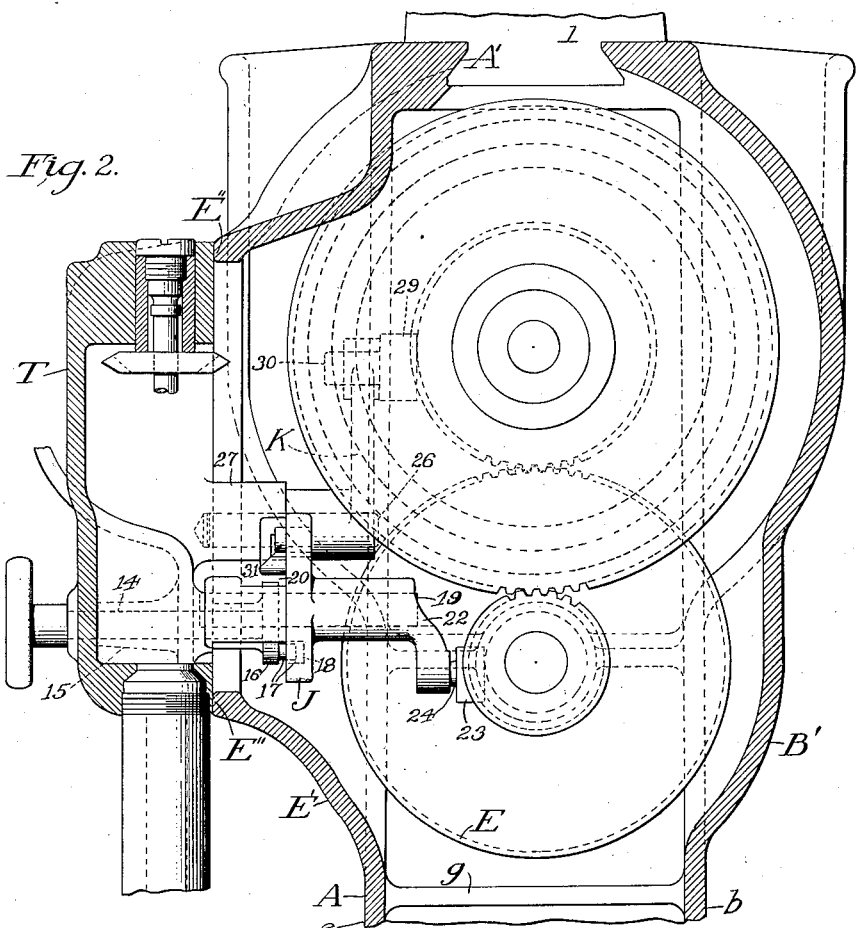
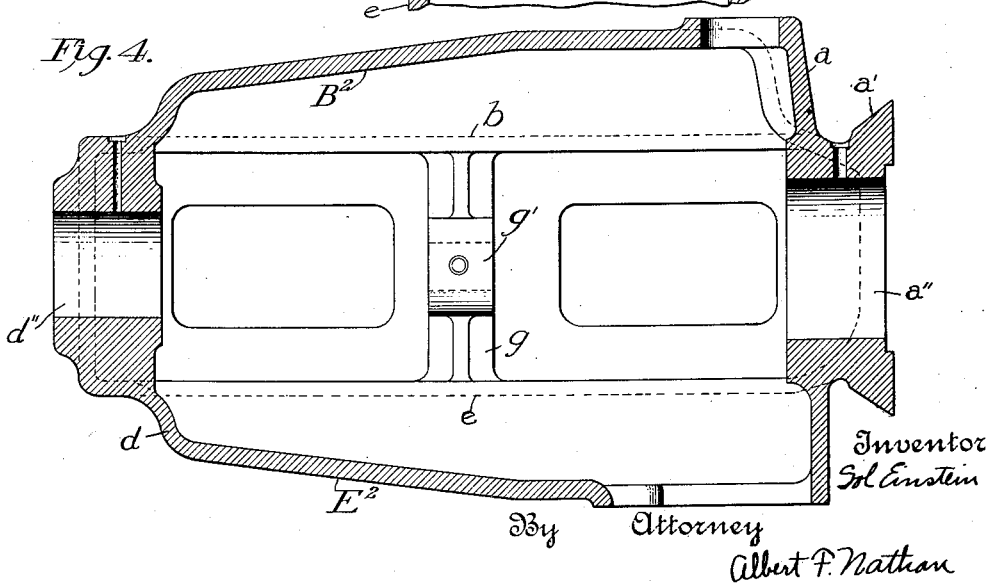

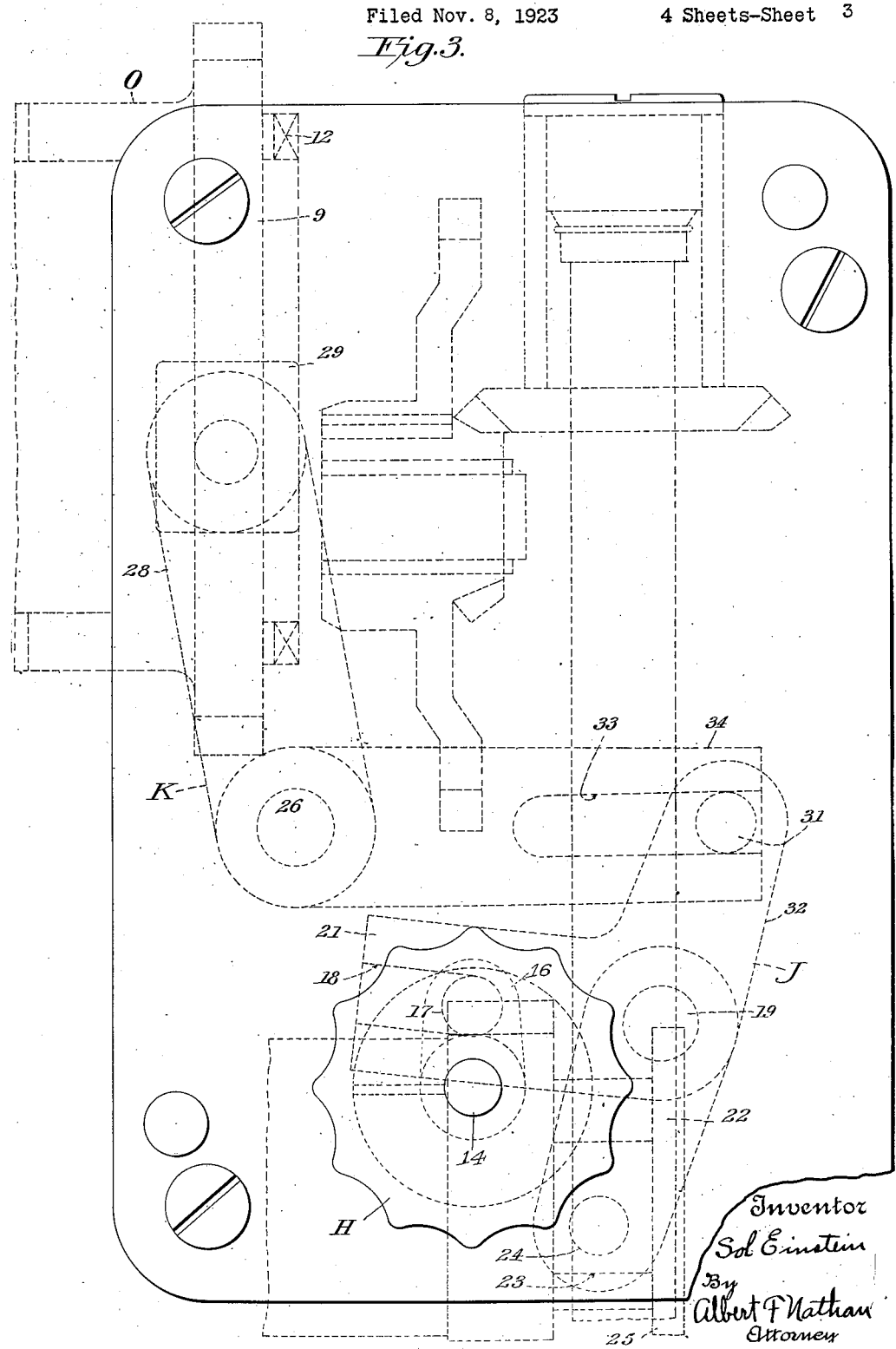

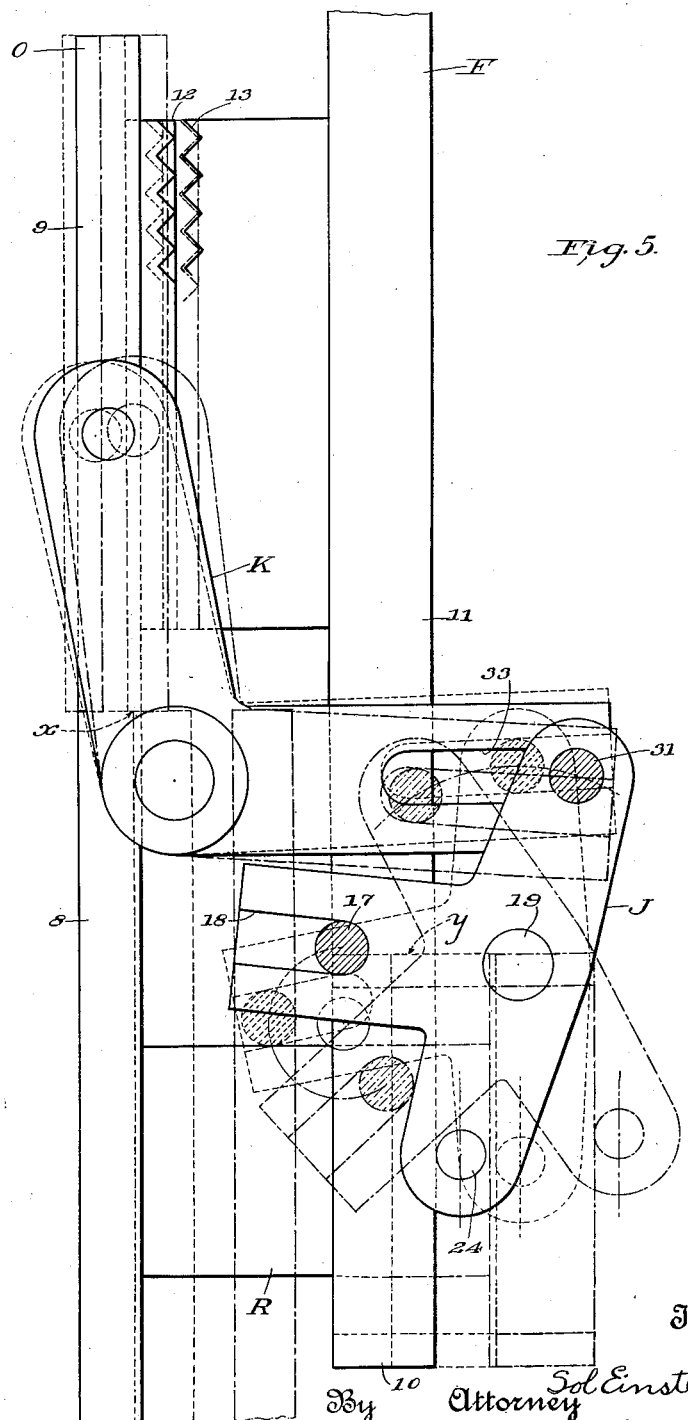

1,688,534

UNITED STATES PATENT OFFICE.

SOL EINSTEIN, OF CINCINNATI, OHIO, ASSIGNOR TO THE CINCINNATI MILLING MACHINE COMPANY, OF OAKLEY, CINCINNATI, OHIO, A CORPORATION OF OHIO.

VARIABLE SPINDLE DRIVE.

Application filed November 8, 1923. Serial No. 673,546.

This invention relates to belt-driven machine-tools and it proposes a novel co-ordination of the several fixed and working elements, with the object of attaining greater compactness in the arrangement, fewer and more rugged parts, and a material reduction in the cost of manufacture.

In certain species of milling-machines, it is usual to arrange certain gears and transmission elements within a hollow column of the so-called "box-type" and to surmount the column with an "over-arm" which protrudes beyond one side and supports the "out-bearing" for the outer end of the spindle that carries the milling-cutter. The spindle derives its motion (through suitable transmission gears) from a pulley which is habitually located at one side of the column to provide for a free and unobstructed travel of the belt which depends from an overlying countershaft. Frequently, this pulley is formed of a series of steps and is known as a "cone-pulley"; the object being to enable a few graduated speeds to be had by a mere shifting of the belt, thereby reducing the number of change gears otherwise requisite for the corresponding series of speeds.

The aforesaid conventional arrangement is more or less awkward and it involves certain structural complications; all of which this invention aims to eliminate.

It is impracticable to make use of cone-pulleys having more than three or four steps and it is likewise impracticable to rely upon only three or four speeds for the spindle in a milling-machine. Consequently, it is usual to employ cone-pulleys in conjunction with change gears capable of compounding the speeds available from the cone-pulley by a factor of two or three; a factor of two being satisfactory when the cone-pulley has at least four steps inasmuch as eight speeds are thereby made available. One of the aims of this invention is to devise a simple and compact two-speed change-gear unit in combination with a cone-pulley, and to so construct and co-ordinate the parts that they may be reduced in number to a minimum and involve but few sliding elements and admit of being arranged compactly and in a manner making it easy to assemble them in the regular course of manufacture.

It is furthermore desirable to combine the change-gears with a simple yet effective manipulating instrumentality and this invention accordingly proposes a sub-mechanism of a relatively simple nature and capable of being smoothly and easily operated, whereby the cone-pulley may be brought into direct driving relation with the spindle, or may be connected thereto through but two sets of intermeshing gears. It is an incidental object to arrange these gears so that, when the cone-pulley is operating under direct-drive, no gears will be idling in mesh; thereby avoiding the undesirable noise of rapidly-running gears and likewise facilitating the operation of shifting. Another incidental object is to keep the column clear of the usual but ungainly looking shift-lever by using, in lieu thereof, a small rotary knob together with a shifting means arranged to move certain parts quite slowly and other parts quite rapidly, but all in appropriately timed relation, so that the gear engagement may be effected smoothly and without the objectionable clashing of teeth so frequent in ordinary arrangements.

Other objects and advantages will be in part indicated in the following description and in part rendered apparent therefrom in connection with the annexed drawings.

To enable others skilled in the art so fully to apprehend the underlying features hereof that they may embody the same in the various ways contemplated by this invention, drawings depicting a preferred typical construction have been annexed as a part of this disclosure and, in such drawings, like characters of reference denote corresponding parts throughout all the views, of which:—

Fig. 1 is a longitudinal section through the axis of the spindle of a milling-machine embodying the present invention showing the stepped driving-pulley, the change-gears, and the over-arm. Fig. 2 is a vertical section taken transversely of the section represented by Fig. 1 and showing partly in section and partly in elevation the means for shifting at differential rates the change-gears. Fig. 3 is a fragmentary left side-elevation of Fig. 2 showing the linkage system whereby the back-gears may be isolated from the direct drive. Fig. 4 is a horizontal section of the column taken through the axis of the spindle-bearings. Fig. 5 is a diagrammatic view showing the mode of operation of the gear-shifting elements and the gears shifted thereby.

The drawings show this invention incorporated in a milling-machine which comprises a suitable base (not shown) on which is mounted a column of the "box-type"; these major frame-elements providing for the mounting of certain working elements such as a knee, a saddle, a table, trip-mechanism for controlling the feeds of said elements, pumps for the lubricant and the cooling fluid and the like; all of which being conventional have not been illustrated.

The column is constructed hollow in form and resembles an elongated box which is open at its upper end for the reception of a dependent belt which rides around a stepped-pulley directly underlying the over-arm as will be presently described in detail. The column, represented by A, has its front end-wall $a$ formed to provide an upright slide-way $a'$ whereby a saddle may be guided and clamped in its various positions. Adjacent its upper end, this end-wall $a$ is also provided with an opening $a''$ which registers with an opening $d''$ in the rear end wall $d$; these openings being for the reception of journals for positioning the spindle. The aforesaid front-end-wall is also provided with an opening $a'''$ for supporting a shaft which carries the back gears, as will be presently described.

The front and rear end-walls are, at their uppermost extremities, provided with V-shaped slideways $A'$ and $D'$ respectively within which is adjustably clamped, in a manner common to machines of this type, an over-arm I.

Interiorly within the column is a transverse web $g$ extending between the side-walls $e$ and $b$. The boss $g'$ provides an opening for receiving the journal of a shaft S on which the back-gear unit is slidably mounted and, to accommodate the back gears, the side-walls of the column are locally bulged outwardly as indicated by $B'$ and $E'$, the latter being further flared to provide an open seat $E''$ against which may be bolted the sub-frame T supporting and mounting parts of the speed-change devices and transmission elements.

The stepped-pulley is arranged co-axially with the spindle and is located intermediate the ends of the spindle; instead of being arranged on the outside of the column, as has heretofore been the custom. This is made possible by reason of the unique formation of the upper end of the column in which the intermediate portions of the side-walls $e$ and $b$ are flared outwardly funnel-like, as indicated by $B^2$ and $E^2$. The parts of these flared wall-portions extending above the axis of the spindle are given a substantially vertical direction but, as indicated by Fig. 4, these portions $B^2$ and $E^2$ may converge rearwardly in proportion to the decrease in diameters of the successive steps of the pulley. Their upper edges extend to the end-walls of the column; thereby forming an open basin, so to speak within which are located the stepped-pulley and the spindle-driving gears; the walls of this basin serving the double purpose of bracing and reinforcing the end-walls of the column and providing belt-guards protecting the user from any injury occasioned by coming in contact with the fast-running belt. The over-arm I extends bridge-like across the open upper end of the column, as shown best by Fig. 1, and is amply supported on the V-shaped seats formed in the respective end-walls of the column; said over-arm being adjustable longitudinally to accommodate various lengths of arbors affixed to the end of the spindle and supported at their outer ends by said over-arm. It will be seen that the belt, in passing around the different steps of the pulley, straddles the over-arm; there being ample clearance between the belt and the over-arm, on the one hand, and the belt and the flaring side-walls $E^2$ and $B^2$, on the other hand. For more specific details of the column reference may be had to applicant's Patent No. 1,492,545, dated April 29, 1924, of which this application is a continuation in part.

The aforesaid arrangement makes for great compactness, rigidity and simplicity in construction. It enables a one-piece casting to take the place of various guards and castings theretofore secured together in previous constructions.

The simplified speed-change mechanism, and the manipulating means, therefor, used in conjunction with the stepped-pulley to multiply the speeds available therefrom will now be described.

A spindle G is rotatably journaled in bushings 1 and 2 suitably retained in the apertures in the end-walls of the column. A gear-unit F is mounted on the spindle adjacent its forward end in close proximity with the front end-wall of the column; said gear-unit being secured by means of a key 3 to the spindle so as to rotate as a unit therewith. Between the gear-unit F and the rear end-wall of the column is located a stepped pulley C, this pulley being supported on bushings $C'$ and $C''$ which are loose on the spindle so that the pulley may revolve independently of the spindle and at different rates relative thereto, depending upon the action of the change-gears. Shiftably mounted on the bushing $C'$ is a gear-unit O which is splined to the pulley by means of an extensible connection consisting of teeth 4 engaging corresponding teeth 5 at the end of the hub 6 of the pulley C. This gear unit O also provides a gear 9 and clutch-teeth 12, later to be referred to.

Mounted in the apertures $a'''$ and $g'$ is a shaft S which is here indicated as stationary and on which is rotatably mounted a bushing 7 which, in turn, carries a shiftable back-gear unit R providing a large gear 8 adapted to be meshed, as shown by Fig. 1 with a small gear 9 on the shiftable gear-unit O. The back-gear unit R provides a small gear 10 adapted to engage a gear 11 forming a part of the non-shiftable gear unit F affixed to the spindle. It will be seen that when the gears are in the position shown by Fig. 1, the motion will be transmitted from the pulley C to the gear-unit O and then through the back-gear R to the gear-unit F, and thus turn the spindle at a reduced speed compared with that of the pulley. When it is desired to turn the spindle faster, i. e., at the same rate as the pulley, the back-gear R is isolated from the gear-units O and F and the latter are clutched together by causing the clutch teeth 12 and 13 to engage; the gear-unit O being shifted for that purpose.

Under these conditions, the spindle will revolve quite rapidly, but there will be no vibration, noise or chatter since the gears 8 and 9, and 10 and 11 are disconnected from each other.

Referring to Figs. 2 and 3, a knurled operating handle H has its shaft 14 extending through the boss 15 provided by a sub-casing T which is bolted to the previously described opening in the side-wall of the column. The inner end of this shaft 14 carries a crank 16 providing a pin 17 which rides in a slot 18 extending radially from the center of oscillation of a T-lever J. This lever is pivoted to a pin 19 seated in a part 20 projecting from the inner face of the sub-casing T. The T-lever is oscillated by the movement of the pin 17 in the slot 18 in its arm 21; the pin admitting of a rotation through 180 degrees and being brought to a stop in each of its extreme positions by reason of impacting against the end of the slot 18. The arm 22 of the T-lever carries a shoe 23 which, by means of a pin 24, is pivoted to the end of the arm 22. This shoe is seated within the annular groove 25 provided by the shiftable back-gear R. It will be seen that a rotation of the hand-grasp H will shift the back-gear R towards the right at a gradually increasing and then decreasing rate; the extent of movement being sufficient to effect a dis-engagement between the gears 10 and 11 and likewise a disengagement between the gears 8 and 9.

The gear unit O is shifted by means of a bell-crank lever K which is pivotally carried by a pin 26 secured to the projection 27 extending from the rear face of the sub-casing T. The arm 28 of the said bell-crank lever carries a straddle-block 29 which is pivotally secured thereto by means of the pin 30 and which straddles the gear 9 so as to control its position. The bell-crank lever is, in turn, moved by a pin 31 secured to the arm 32 of the T-lever J. This pin rides in a slot 33 extending radially from the axis of oscillation of the lever K; said slot being formed in the arm 34 thereof. It will be noted that each of the shiftable gear units is, accordingly, controlled by what is known as a sliding block linkage. The elements of these two linkages are so mutually related and proportioned that they occupy dead center positions in the ultimate positions of the gears and thereby serve effectively to retain said gears against any fortuitous shifting.

When the parts are positioned as shown in Figs. 3 and 5, the gears are in the meshing relation shown by Fig. 1, in which case the transmission of motion takes place through the back-gears. Upon turning the hand-grasp anti-clockwise, (see Fig. 5) the gear-unit R is moved steadily to the right, first at an accelerating rate and then at a decreasing rate. At the same time, the pin 31 slides in the slot 33 and slowly moves the lever K anti-clockwise, thereby slowly shifting the gear-unit O a short distance to the left, as shown in dotted lines in Fig. 5; these combined movements being effective to disengage the gears 8 and 9 (as shown at $x$ in Fig. 5) before the gear-unit R has reached its ultimate position. As the lever J continues to turn, the gear-unit R continues to move to the right until it finally is completely disengaged from the gear-unit F. During this remaining partial stroke, the pin 31 (it has now passed its dead center) is turning the lever K at an accelerating rate in a clockwise direction and this advances the momentarily retreated gear-unit O until it effects an engagement between the clutch-teeth 12 and 13. The spindle is now in direct drive with the pulley and the back-gear R is completely isolated as shown in dot-dash lines in Fig. 5. In returning to the original positions, i. e. again to drive through the back-gears, the hand-grasp is rotated clockwise and the parts pass through the same positions but in the reverse order. Therefore the first movement will be from the dot-dash line position in Fig. 5 to the dotted line position. This causes the clutch-teeth 12 and 13 first to be disengaged and next the gears 10 and 11 to be engaged as indicated at $y$. A continued rotation of the hand-grasp causes the lever K to be turned clockwise and the gears 8 and 9 to be engaged and the parts brought to rest in their full line positions in Fig. 5.

Without further analysis, the foregoing will so fully reveal the gist of this invention that others can, by applying current knowledge, readily adapt it for various utilizations by retaining one or more of the features that, from the standpoint of the prior art, fairly constitute essential characteristics of either the generic or specific aspects of this invention and, therefore, such adaptations should be, and are intended to be, comprehended within the meaning and range of equivalency of the following claims.

Having thus revealed this invention, I claim as new and desire to secure the following combinations and elements, or equivalents thereof, by Letters Patent of the United States:

1. A machine tool combining a spindle; a gear-unit keyed thereto and providing a gear and a clutch-element; a driving member loosely journaled co-axially with said spindle; a shiftable gear-unit splined to said driving member and providing a gear and a clutch element adapted to engage said first mentioned clutch-element; a shiftable back-gear unit providing gears of unequal sizes adapted to mesh with gears on said two first-mentioned gear-units; and means for shifting said shiftable gear-units at different rates successively to disconnect said clutch-elements and connect the back-gears with the gears of said two first-mentioned gear-units.

2. A machine-tool combining a spindle; a gear-unit affixed thereto and providing a gear and a clutch-element; a driving element loosely journaled co-axially with said spindle and supported thereby; a shiftable gear-unit axially movable with respect to said driving element but clutched to rotate therewith and providing a gear and a clutch-element adapted to engage said first-mentioned clutch element; a shiftable back-gear unit providing gears adapted to mesh with the gears on said two first-mentioned gear-units; and means for shifting said shiftable gear-units to successively disconnect said clutch-elements and connect the back-gears with the gears of said two first-mentioned gear-units; said shifting means including a rotatable hand-grasp; a bell-crank lever actuated thereby and connected with said back-gear, and a second bell-crank lever operatively connected with the first-mentioned shiftable gear-unit, and operatively connected with said first-mentioned bell crank lever to be actuated thereby.

3. A mechanism of the nature disclosed combining a spindle; a gear-unit secured thereto and comprising a gear and a clutch-element; a driving member journaled co-axially with said spindle; a shiftable gear-unit operatively connected with said driving member and providing a gear and a clutch-element; a shiftable back-gear unit providing gears adapted to mesh with the gears on said first two gear-units; and a gear shifting mechanism for shifting said gear-units comprising a rotatable hand-grasp; a bell-crank lever operatively connected with one of said shiftable gear-units; a pin-and-slot connection between said bell-crank lever and said hand-grasp; a second bell-crank lever operatively connected with the other of said shiftable gear-units, a pin-and-slot connection between said bell-crank levers for actuating the latter from the former.

4. A machine-tool combining a spindle; a shiftable driving gear-unit journaled coaxially with said spindle and providing a gear and a clutch-element; a non-shiftable driven gear-unit secured to said spindle and providing a gear and a clutch-element adapted to engage the first-mentioned clutch-element; a shiftable back-gear unit providing a large gear and a small gear; and means including a rotary member, a plurality of connected levers operatively connected with said shiftable gear-units and a pin-and-slot connection between said rotary member and one of said levers for shifting said driving gear-unit and said back-gear unit at variable speeds to engage its large and small gears, respectively with the gears of said shiftable and non-shiftable gear-units.

5. A mechanism of the character revealed combining a shiftably mounted driving gear-unit providing a gear and a clutch-element; a non-shiftable gear-unit providing a gear and a clutch-element adapted to engage said first named clutch-element; a shiftable back-gear unit providing gears adapted to mesh with the gears on said first two gear-units to produce a relatively low-rate drive in said non-shiftable gear-unit; and means for shifting said shiftable gear-units first to isolate said back-gears and thereafter to engage said clutch-elements to rotate said non-shiftable gear-unit at a relatively high-rate, said shifting means comprising a rotatable hand-grasp; a pin carried thereby; a T-lever providing a stem formed with a slot engaging said pin, and laterally extending arms; an operative connection between one of said arms and said back-gear unit; a pin carried by the other of said arms; a bell-crank lever of which one arm is formed with a slot embracing the pin in said T-lever and the other arm is operatively connected to said shiftable driving gear, said gear shifting mechanism being so constructed and arranged that during a continued movement of the hand-grasp the pin carried by the T-lever is adapted to pass through a dead-center position whereby the driving gear-unit is moved in opposite directions while the back-gear is moved in a single direction to successively disconnect the two shiftable gear-units and then to engage said clutch-elements.

6. A machine tool combining a spindle; a driving gear therefor; a shaft parallel with said spindle; a driving member rotatably journaled coaxial with said spindle; a gear-unit translatable but non-rotatable relative to said driving member and adapted to be clutched to said driving gear; back-gears translatably mounted on said shaft and adapted to establish a driving connection from said gear-unit to said driving-gear when the two last mentioned elements are declutched; shifting means for said gear-unit and said back-gears comprising a first lever connected with said back-gears, a second lever connected with said gear-unit; manual means for actuating one of said levers; and an operative connection between said levers to cause the manually actuated lever to shift the other lever.

7. A machine tool combining a spindle; a driving gear therefor, a shaft parallel with said spindle; back-gears rotatably and translatably journaled on said shaft; a driving member loosely journaled coaxial with said spindle; a shiftable gear-unit translatable but non-rotatable relative to said driving member and adapted to be clutched directly to said driving gear; and two inter-connected levers connected, respectively, with said shiftable gear-unit and with said back-gears for shifting said gear-unit and said back-gears first in the same direction and then in different directions to de-clutch said gear unit from said driving gear and to effect a driving connection from said gear-unit to said driving gear through said back-gears.

In witness whereof, I hereunto subscribe my name.

SOL EINSTEIN.